Figure 1:
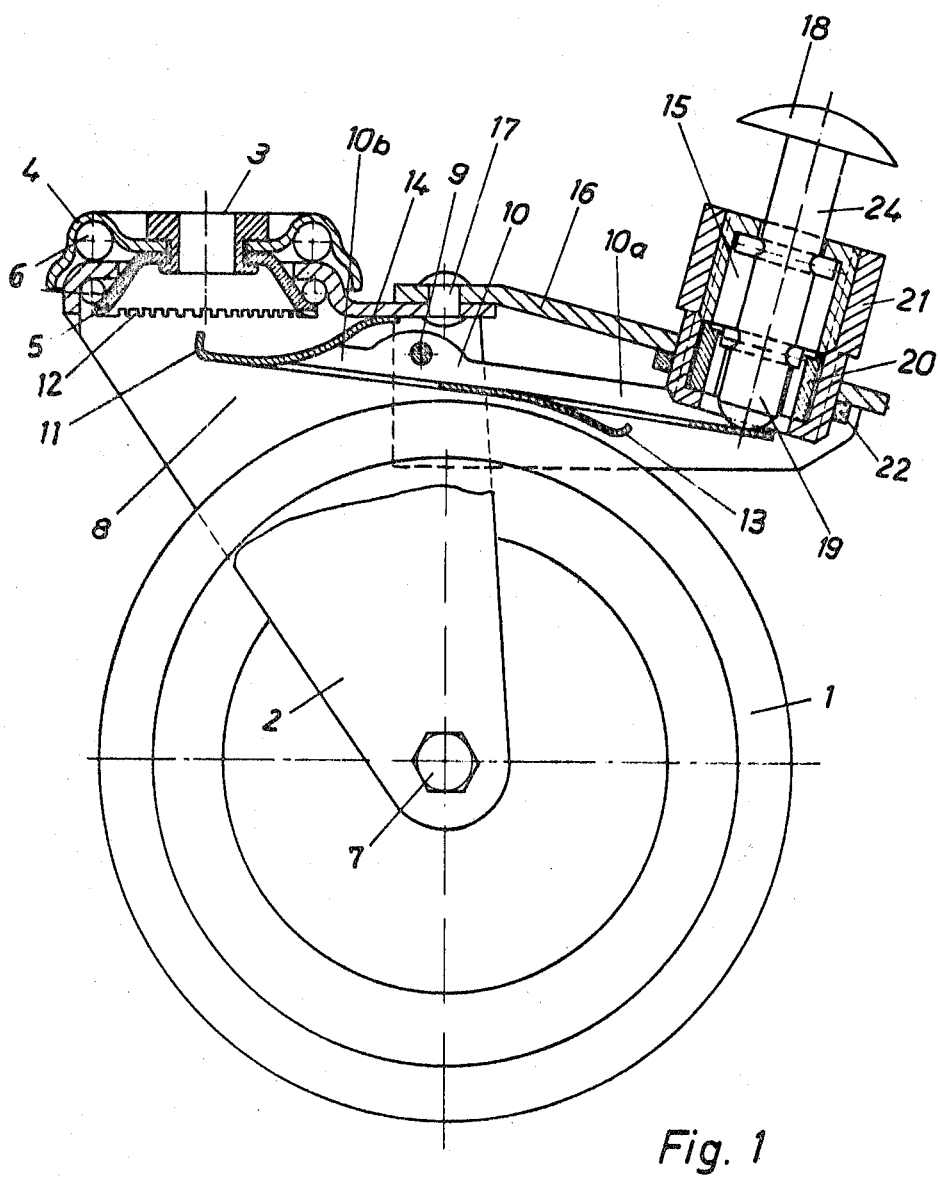

United States Patent

[11] 3,571,842

| [72] | Inventor | Dietrich Fricke |
| | | Wermelskirchen, Rhineland, Germany |
| [21] | Appl. No. | 695,942 |
| [22] | Filed | Jan. 5, 1968 |
| [45] | Patented | Mar. 23, 1971 |
| [73] | Assignee | Tente-Rollen G.m.b.H. & Co. |
| | | Wermelskirchen-Tente, Rhineland, Germany |
| [32] | Priority | Jan. 21, 1967 |
| [33] | | Germany |
| [31] | | T33041 |

[54] RUNNERS PARTICULARLY CASTERS
20 Claims, 47 Drawing Figs.

[52] U.S. Cl. .................................................. 16/35
[51] Int. Cl. .................................................. B60b 33/00
[50] Field of Search ....................................... 16/35, 35 (d); 188/1 (d)

[56] References Cited
UNITED STATES PATENTS
2,684,734  7/1954  Wilson .................. 16/35UX
2,831,699  4/1958  Holmes .................. 16/35X
3,162,888  12/1964  Mobus .................... 16/35
FOREIGN PATENTS
984,065  2/1965  Great Britain .......... 16/35
1,134,805  8/1962  Germany ................ 16/35

Primary Examiner—Bobby R. Gay
Assistant Examiner—Doris L. Troutman
Attorney—Burgess, Dicklage & Sprung ABSTRACT: A box runner or caster is provided with a locking device for locking the running and/or swiveling movements of the running wheel. The locking device consists of a pivoted two armed lever having one end shaped to engage in fixed teeth to prevent swiveling and the other end shaped to engage the tyre of the running wheel. The lever is spring biased into the unlocked position and can be moved into its locking position by means of a ball pen press mechanism so that alternate operation of the press mechanism causes locking and unlocking respectively.

Inventor:
Dietrich Fricke
By: Burgess, Dinklage & Sprung
Attorneys

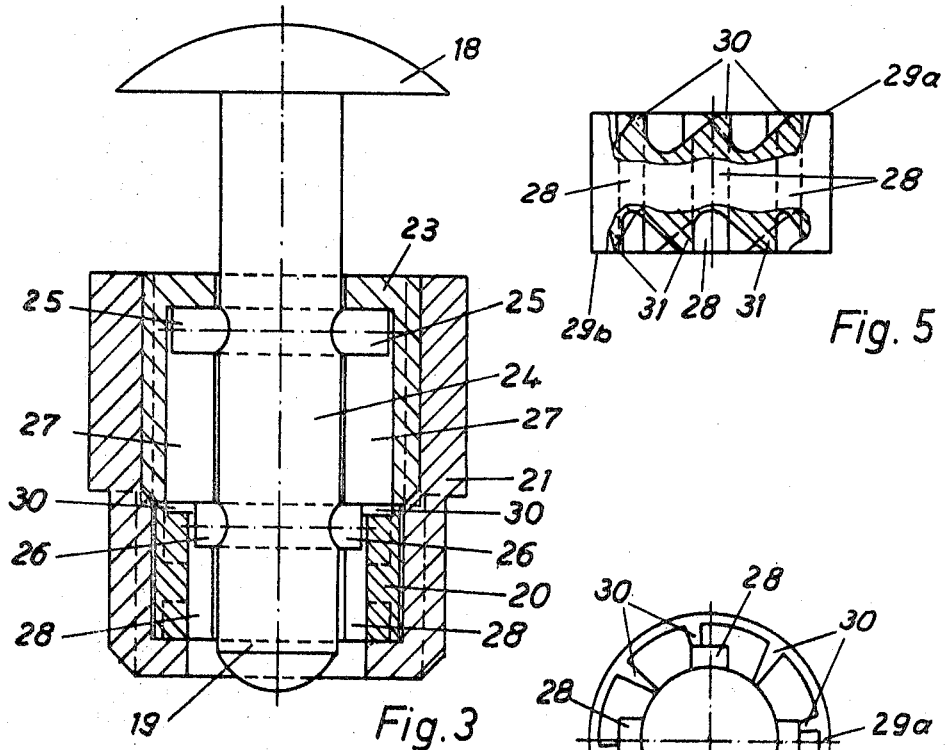
Fig. 3
Fig. 5
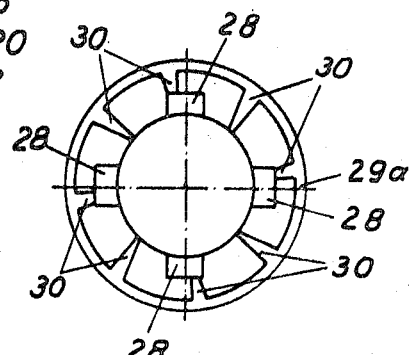
Fig. 6
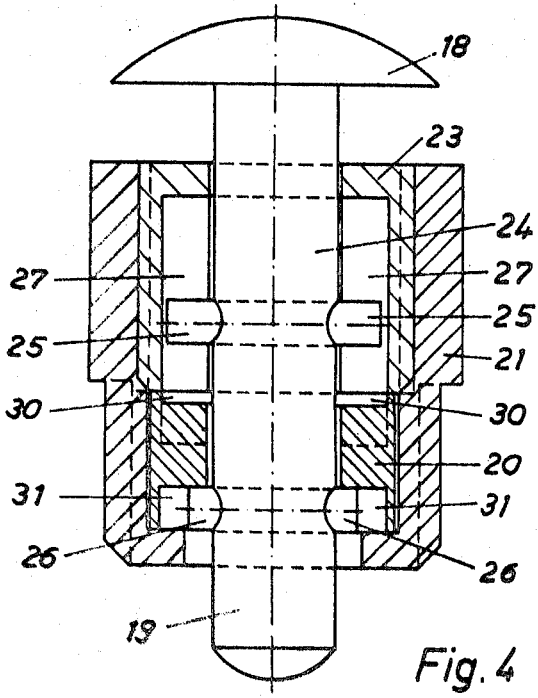
Fig. 4
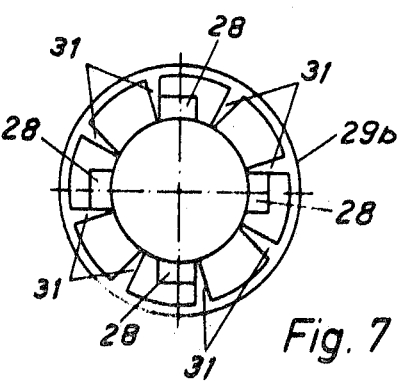
Fig. 7
INVENTOR:
Dietrich Fricke
By: Burgess, Dinklage & Sprung
Attorneys INVENTOR
DIETRICH FRICKE
By: Burgess, Dinklage, Sprung
Attorneys

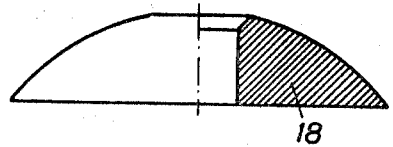
Fig. 18
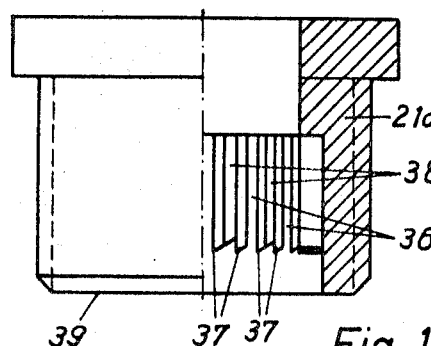
Fig. 19
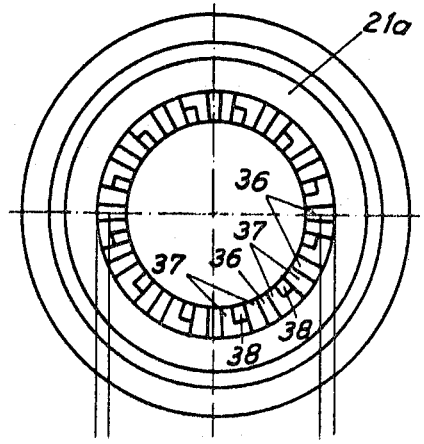
Fig. 23
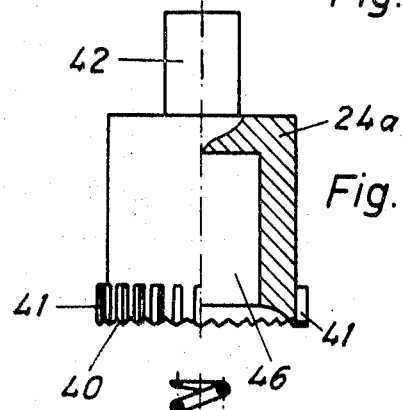
Fig. 20
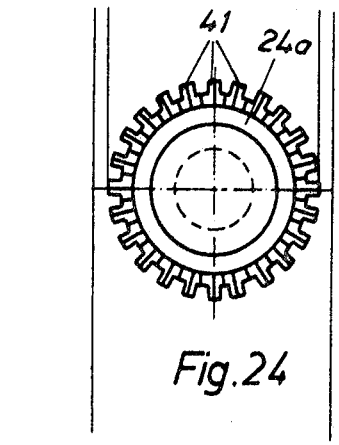
Fig. 24
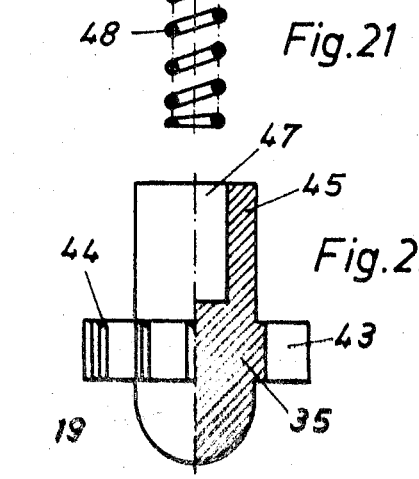
Fig. 21
Fig. 22
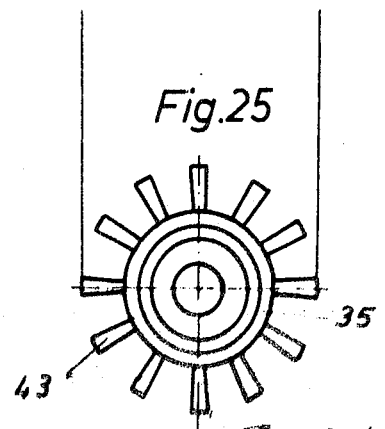
Fig. 25
INVENTOR:
DIETRICH FRICKE
By: Burgess, Dinklage & Sprung
Attorneys

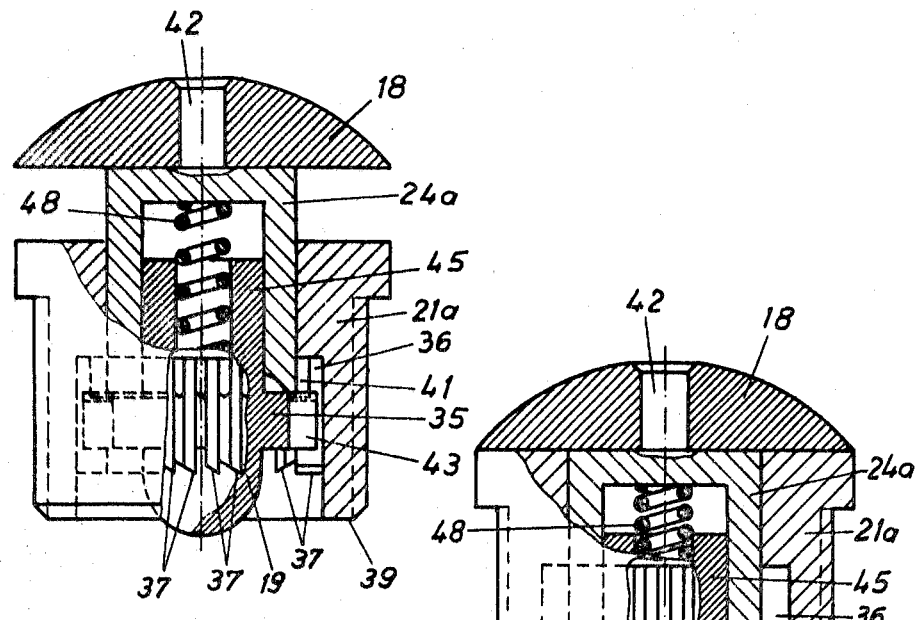
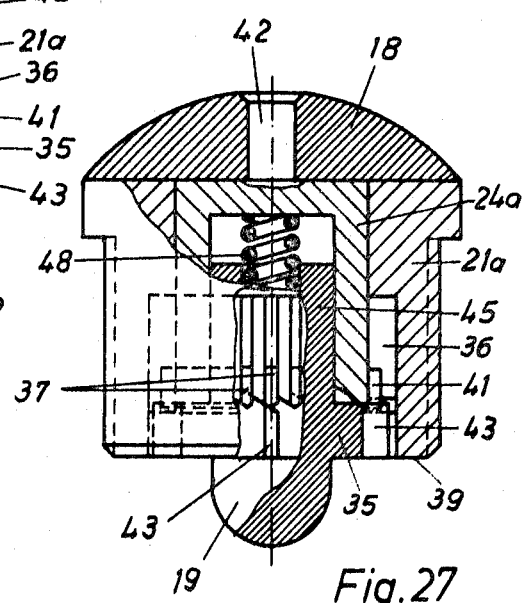
Fig. 26
Fig. 27
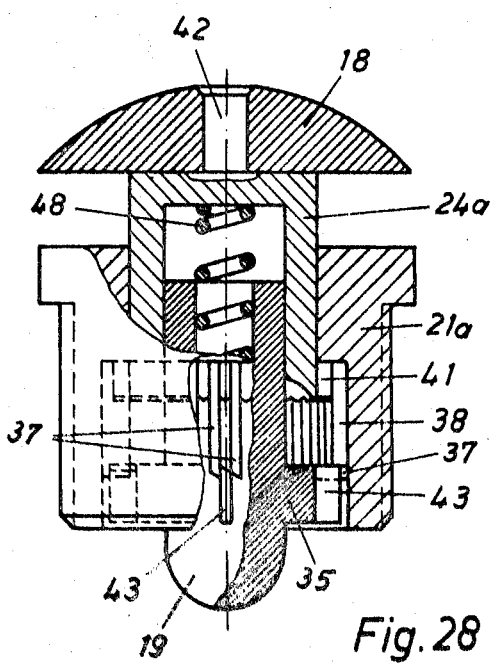
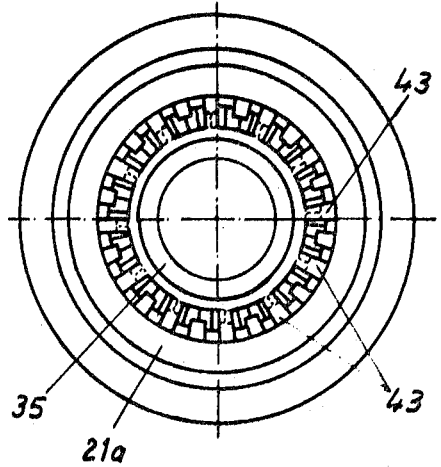
Fig. 28
Fig. 29

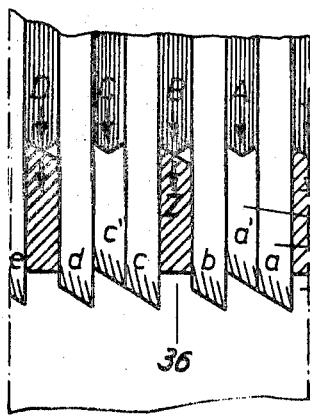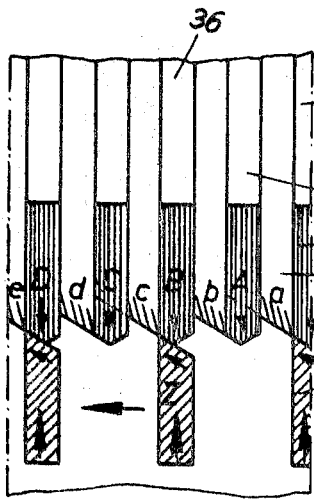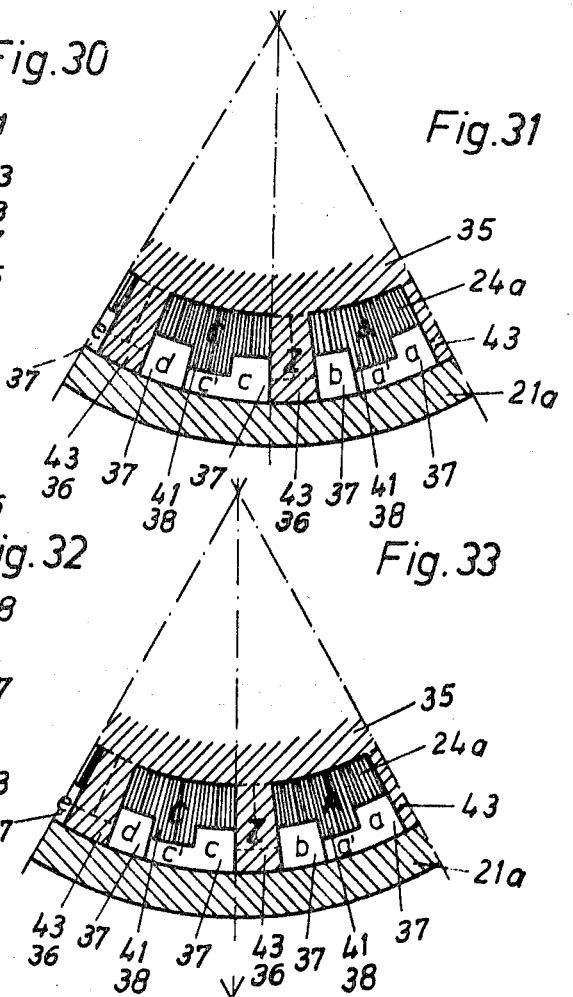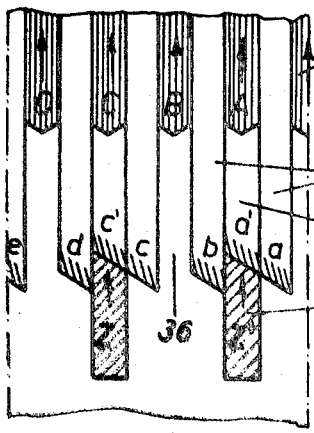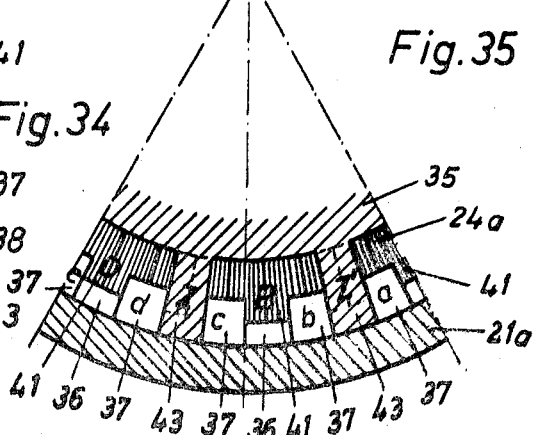

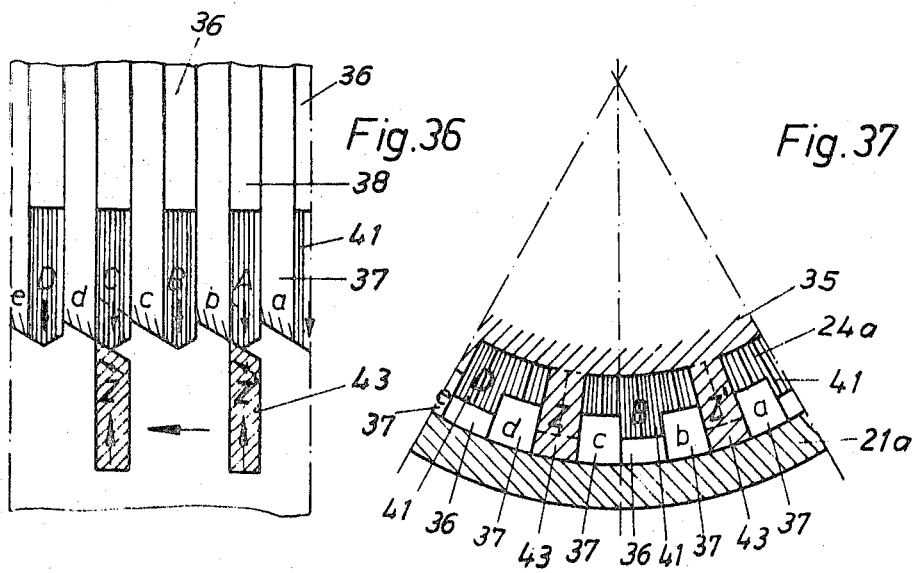
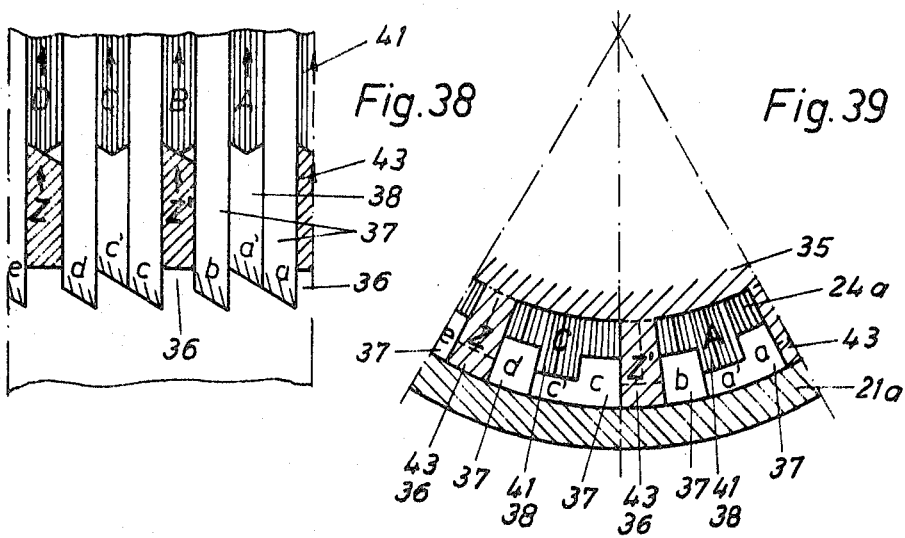

Inventor
Dietrich Fricke
By: Burgess, Dinklage & Sprung

RUNNERS PARTICULARLY CASTERS

This invention relates to a runner, for example a box runner or a caster, with a locking device for locking the running wheel. In the case of a box runner the locking device is used for locking the running movement of the running wheel. In the case of a caster with a running wheel, then the locking device can be operative instead, or additionally, to prevent the running wheel from swiveling. The invention particularly relates to casters with a locking device for simultaneously or in stages locking the running wheel against both running and swiveling.

With such runners, and particularly caster, the locking device generally comprises a locking member (usually supported in the hollow of the fork), which, for locking the running movement of the running wheel is pressed in a suitable manner against the wheel tyre, and/or for locking the swiveling movement of the running wheel is brought into engagement for example with a set of teeth on a fixed ball bearing bush of the runner suspension system. The locking member, which may consist for instance of a stable laminated spring or a one-armed or two-armed rocking lever, may be brought brought at will, into its locking position and back again into its released position, by means of a pedal shift lever provided on the runner. This can be done by acting on the pedal shift lever with the point of the foot, the pedal shift lever being moved downwards to lock the runner and raised again with the point of the foot to unlock.

The raising of the pedal shift lever by means of the pint of the foot is however arduous, and, particularly in the case of hospital equipment fitted with such lockable runners, leads to damage to the light footwear usually worn by female hospital personnel in particular. Runners with a locking device have therefore already been suggested in which both the locking and unlocking of the runner can be effected by successive pressings down of the pedal shift lever. For this purpose there is rotatably supported in the runner fork an oval or polygonal rocker provided with a ratchet wheel. Each time the pedal shift lever is pressed down the rocker is rotated by one ratchet tooth, and thus acts alternately to lock and release the locking member supported in the fork hollow.

A locking device constructed in this way is however comparatively expensive for runners of the cheap mass-produced type, particularly because of the requisite high precision of the ratchet mechanism and the additional bearing required for the rocker in the wheel fork. Furthermore such a shift mechanism, because of the scarcity of space available, cannot be accommodated in the runner fork completely out of sight, so that runners thus fitted do not have a pleasing appearance, although such pleasing appearance is of importance for their use as lockable furniture or appliance runners.

The invention avoids these disadvantages and provides a runner, particularly a caster, with a surprisingly simple pushbutton actuation of the locking device, which is not only simple and cheap to produce, but also gives the runner a very pleasing appearance.

The invention is characterized as regards its basic idea by the use of the press mechanism already known for use in connection with press type ballpoint pens and similar writing instruments, as a latching member for the locking device of a runner.

Press type ballpoint pens and similar press type writing instruments have a writing cartridge axially movable in the barrel against the action of a return spring, and a press mechanism to be actuated by finger pressure, with a press button projecting axially out of the barrel of the writing instrument. By operating the press mechanism, the axially movable writing cartridge can be brought out of the inoperative position, where its writing point is inside the barrel, into the locked writing position, and then by fresh actuation of the press mechanism can be brought back by the return spring into the inoperative position by releasing the lock, so that the ballpoint pen press mechanism is also termed a press alternating shift mechanism. It may be a question here for instance of the use of a shift sleeve rotatable with respect to the pushbutton and the lead carrier, with shift teeth of different depths at the end face, or a toothed ring rotatable at the end face, which cooperates with cams or ribs inside the barrel of the writing instrument. It may also be a question, for instance, of a ball press mechanism with a ball arranged between the writing cartridge and the barrel of the writing instrument and rolling as a locking body in a curved track, or a pin guiding arrangement in a curved track, or a swiveling connecting pin, which by actuation of the press mechanism can be brought into various positions corresponding to the inoperative position and the writing position of the writing instrument point.

The basic idea of the invention thus rests on the transfer of the press mechanism or press alternating mechanism already known in connection with press type ball pens and similar writing instruments to a completely novel and perfectly different purpose in connection with lockable runners, as used for instance for rendering mobile hospital beds and furniture and other appliances and equipment, adapting the same to the quite different special requirements in connection with the actuation and stopping of a locking device for locking the wheel of the runner against running and/or swiveling Here the duty of the return spring provided in the case of the press type ballpoint pen, which during the release operation of the press alternating mechanism draws the pencil lead or writing cartridge, back inside the said barrel, is taken over in the case of the lockable runner by the spring locking member supported in the fork hollow, or by a separate spring provided in the locking device.

The new runner, which may in particular be a caster, and is provided with a locking device for locking the running wheel against running and/or swiveling, and which can be brought by means of a pedal actuation member, against a spring pressure, into its locking position and arrested there and then released again, is characterized in accordance with the basic idea of the invention in that its locking device has as a latching member a ball point pen press mechanism. The press mechanism, which in the case of a ballpoint pen consists of only very small sheet metal components or injection mouldings is made correspondingly stronger when used constructionally as a latching or stop member for the locking device of a runner correspondingly to the considerably greater actuating and latching or stop forces occurring and exerted in the case of locking runners.

The press mechanism used in the case of ballpoint pens can be arranged in various suitable ways when used as a latching member in the locking device of the runner. A runner, particularly a caster, is however particularly advantageous, when its locking device has as an actuating and latching member a ballpoint pen press mechanism with a pushbutton, which can be actuated by the point of the foot. Such a pushbutton actuation is very simple and cheap to produce and gives the runner, particularly in the case of a caster, a very pleasing appearance, as inter alia the bulky pedal shift lever which would otherwise be present is omitted.

In a particular embodiment of the invention the runner is characterized in that its locking device has as a latching member a ballpoint pen press mechanism acting with a toothed shift sleeve. Such a ballpoint press mechanism if represented and described in principle in, for instance, German Pat. specifications Nos. 1,108,589 and 1,118,052 and also 1,123,399.

In another embodiment of the invention the runner is characterized in that its locking device has as a latching member a ballpoint pen press mechanism acting with a toothed rotary disc. Such a ballpoint pen press mechanism is represented and described in principle in, for instance, German Pat. specifications Nos. 1,144,620 and 1,159,811.

In a further embodiment of the invention the runner is characterized in that its locking device has a ballpoint pen ball press mechanism acting with a ball guide arrangement. Such a ballpoint pen press mechanism is represented and described in principle in, for instance, German Pat. specifications Nos. 1,090,547 and 1,187,520.

In yet another embodiment of the invention the runner is characterized in that its locking device has a ballpoint pen press mechanism working with a pin guide arrangement. Such a ballpoint pen press mechanism is represented and described in principle in, for instance, German Pat. specification No. 1,003,090.

In a still further embodiment of the invention the runner is characterized in that its locking device has a ballpoint pen press mechanism acting with a swiveling coupling pin. Such a ballpoint pen press mechanism, which works with a swiveling coupling member also designated as a swash body, is represented and described in principle in, for instance, German Pat. specifications Nos. 1,082,528 and 1,145,960.

The basic forms of the invention can be further developed inventively in special ways.

According to a particularly advantageous modification of the invention the runner is characterized in that the latching member has a press pin axially moveable nonrotatably against spring pressure and coaxially round this an axially immovable rotatable shift sleeve with internal splines and at both end faces in each case twice as many axially directed ratchet teeth, with which projections arranged at different heights on the press pin can cooperate in that with repeated actuation and release of the pushbutton the end face toothed shift sleeve is rotated in each case by one ratchet tooth, the return movement of the press pin being alternately locked or released.

According to another modification of the invention the runner is characterized in that the latching member has a fixed sleeve with internal splines and at the end face twice as many axially directed ratched teeth, and also furthermore coaxial and guided longitudinally displaceable in the groove, both an outwardly grooved axially-movable nonrotatable press pin with an equal number of axially directed ratchet teeth at the end face, and also an axially movable rotary disc, grooved at the periphery and with crown type teeth, which can cooperate with the end face ratchet teeth of the sleeve of the press pin by engagement in such a way that with repeated actuation and release of the press pin the crown toothed rotary disc on leaving the sleeve grooves and reentry into the sleeve grooves is rotated in each case by one ratchet tooth, and thus the return movement of the rotary disc is alternately locked or released.

According to still another modification of the invention the runner is characterized in that the latching member has a fixed sleeve with an inner groove and also coaxially in the sleeve an axially movable press pin with an outer groove, one of the two grooves being a control track and the other a transverse groove crossing this, and in the point of intersection (variable in position) of the two grooves a ball, as a locking body, is supported freely movable, which on repeated actuation and release of the press pin can be guided by the transverse groove in one or more locking positions and unlocking positions of the control track in such a way that the return movement of the press pin can be alternately locked or released.

A particularly simple locking device is obtained with a modification of the invention, in which the runner is characterized in that the latching component of the ballpoint pen press mechanism has a clamping bolt acting directly on a locking member arranged in the hollow of the runner fork and rests resiliently against the locking member. Both from the constructional viewpoint and also as regards production and cost a runner has been found particularly advantageous in which the locking member is a laminated spring, which presses continuously against the clamping bolt of the ballpoint pen press mechanism.

The locking member, whether rigid or consisting of a laminated spring, may advantageously take the form of a rocker supported in the hollow of the runner fork and continuously biassed by a spring so that one of its lever arms is pressed against the clamping bolt of the ballpoint pen press mechanism.

Figure 2:
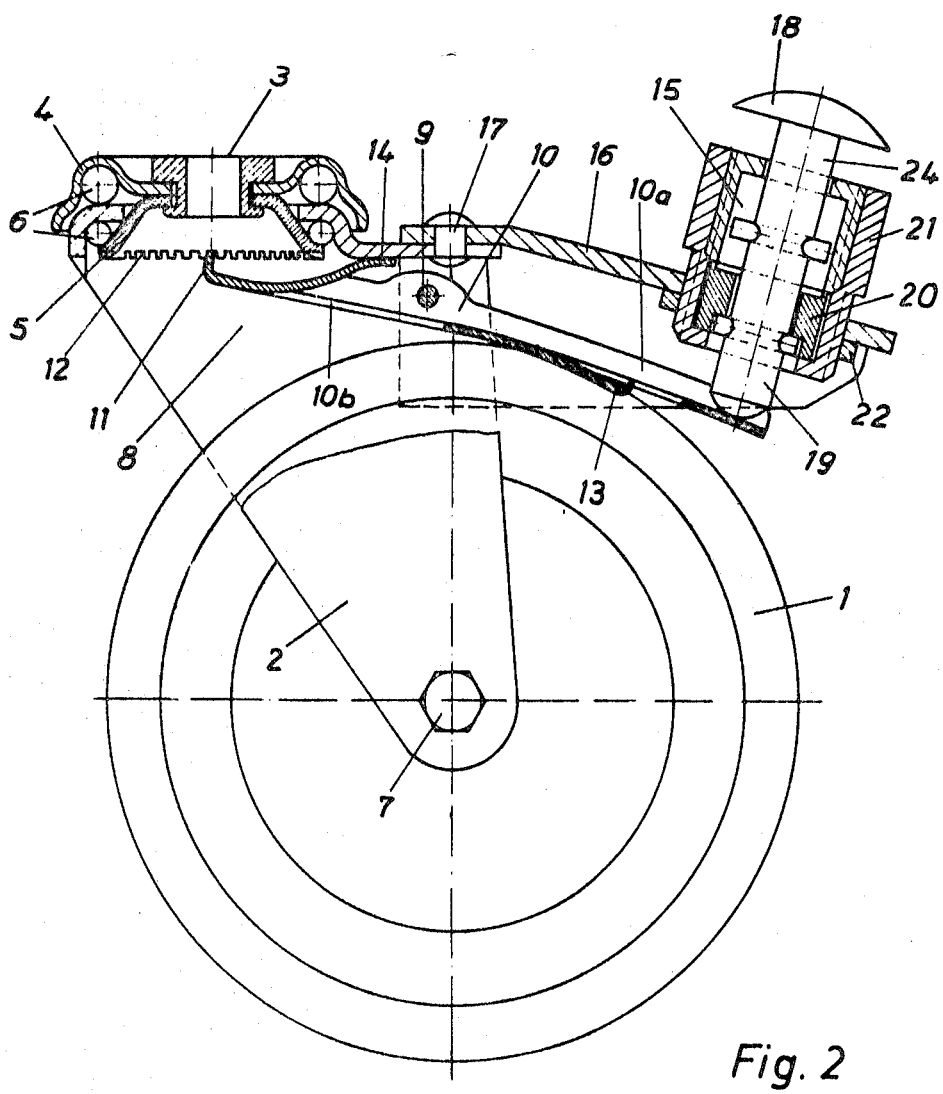
Figure 14:
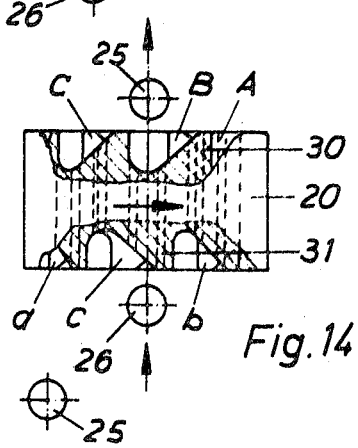
Figure 15:
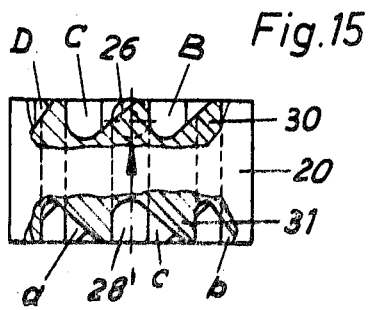
Figure 16:
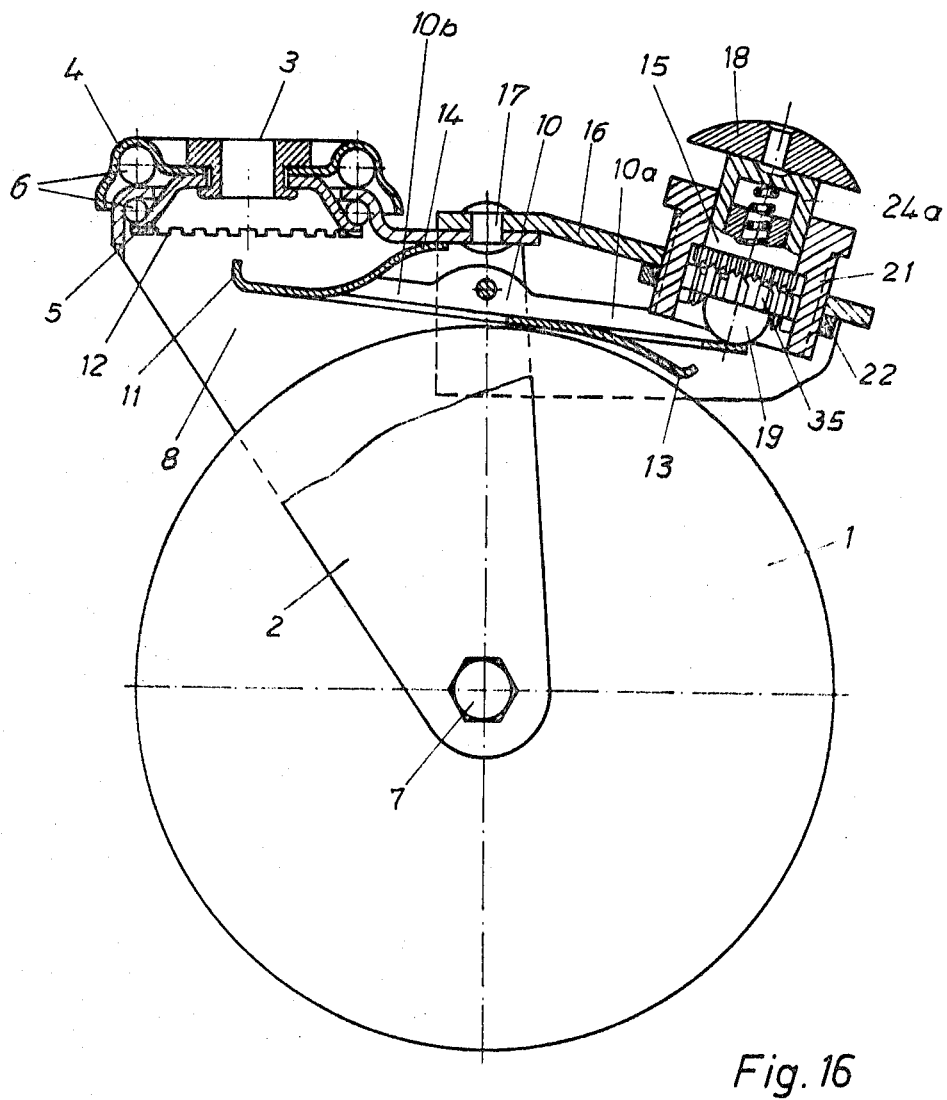
Figure 17:
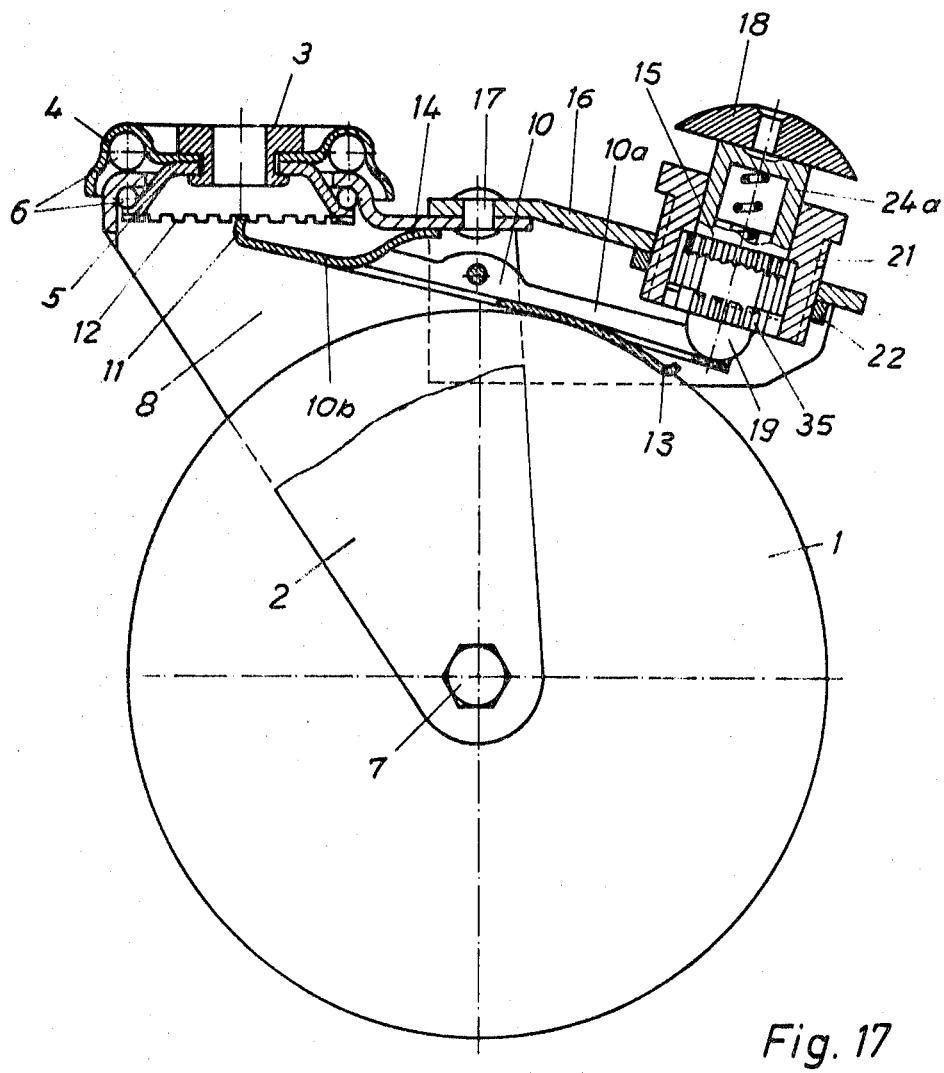
Figure 40:
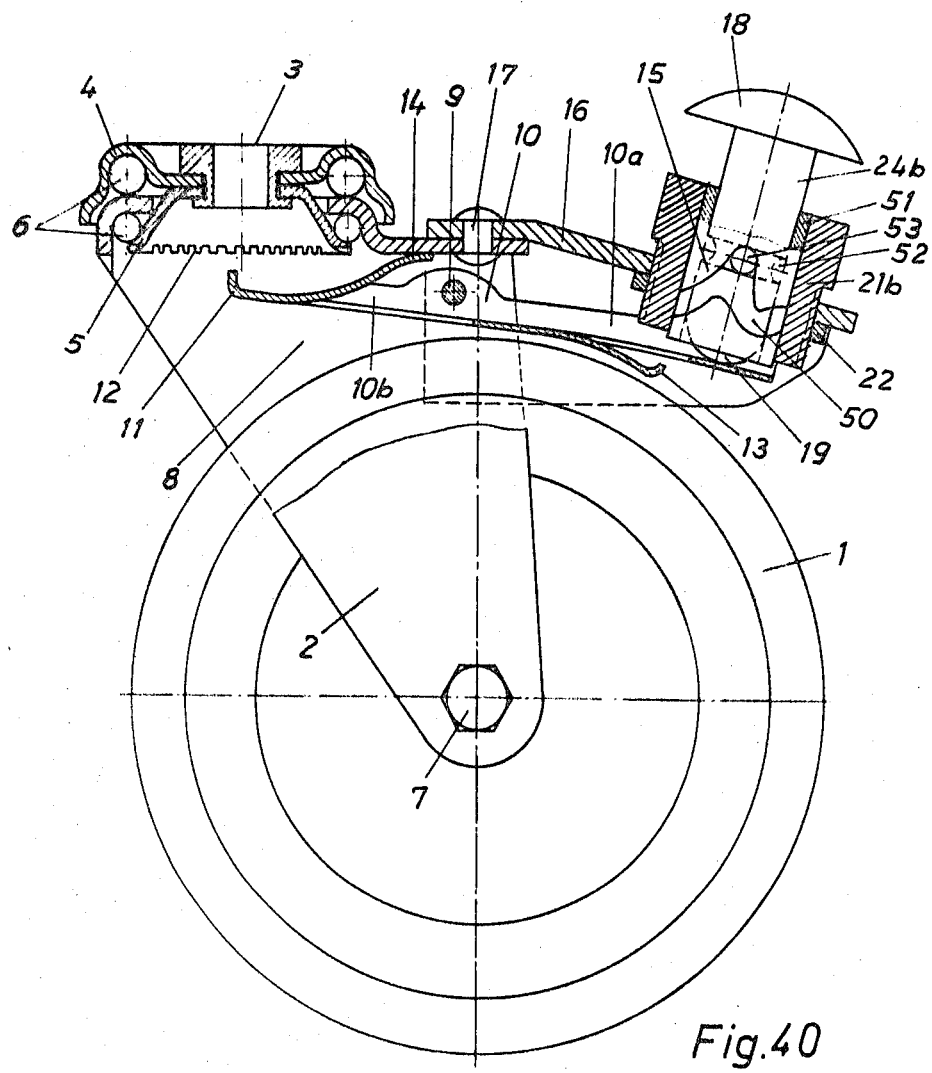
Figure 41:
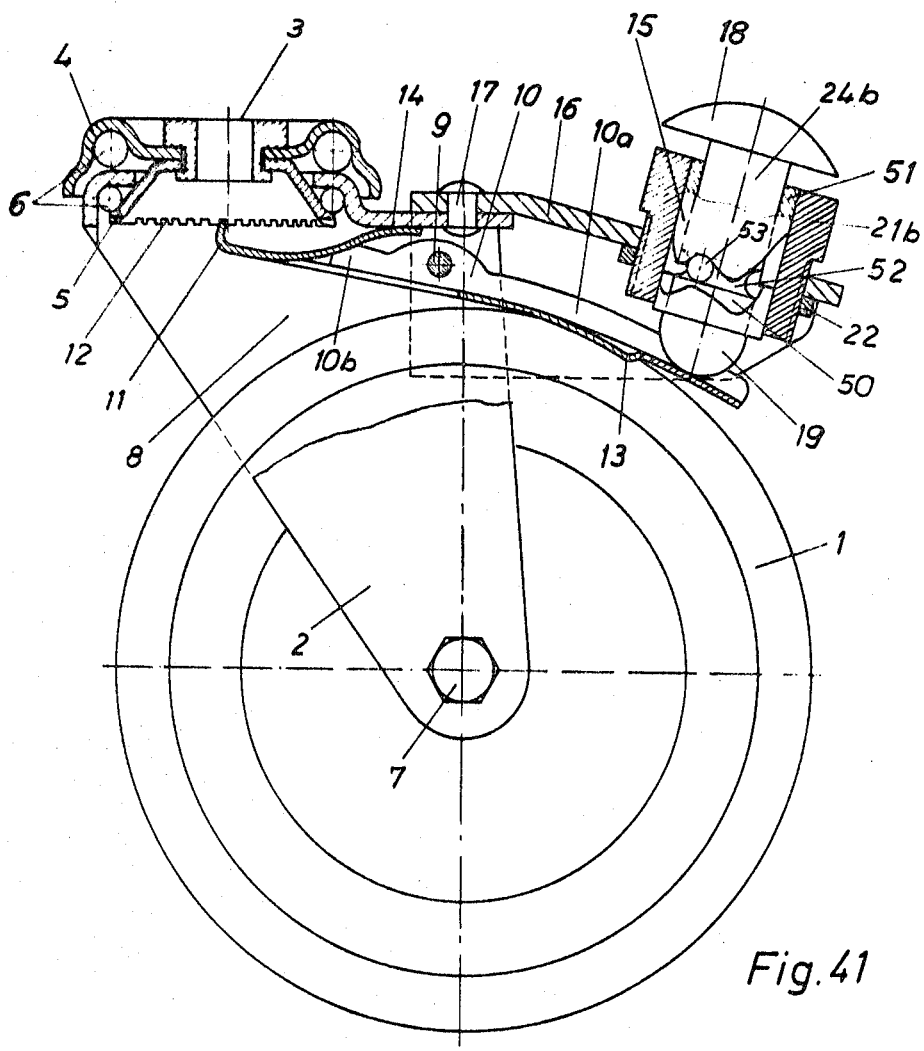
Figure 42:
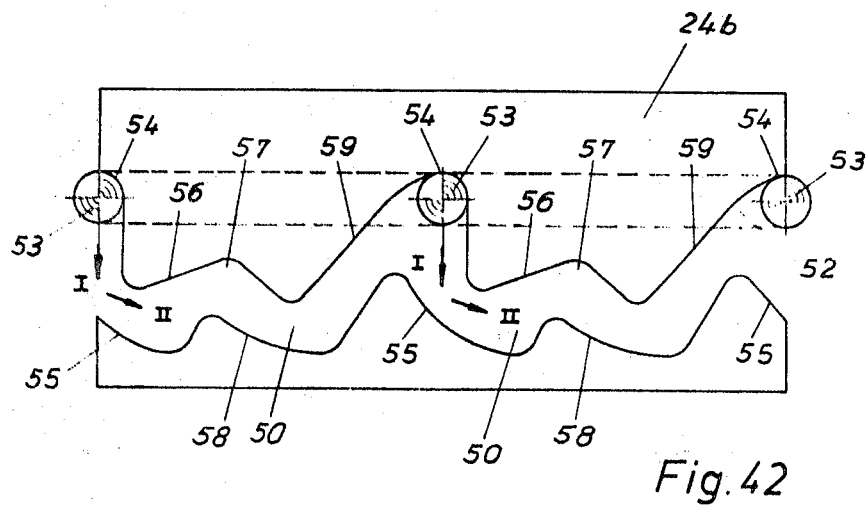
Figure 43:
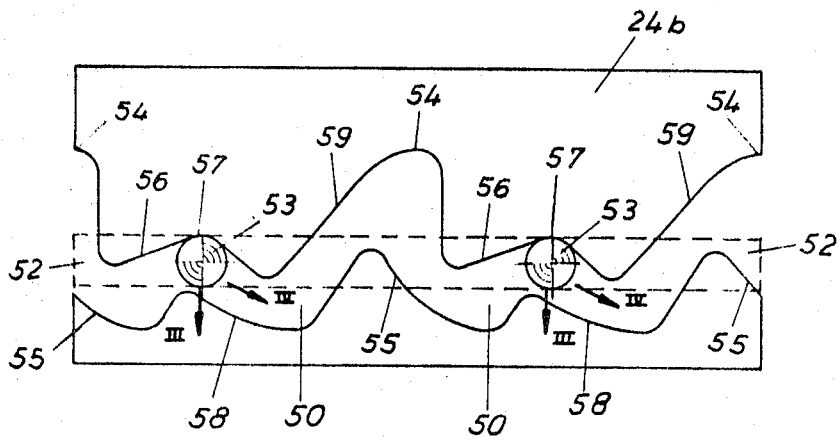
Figure 44:
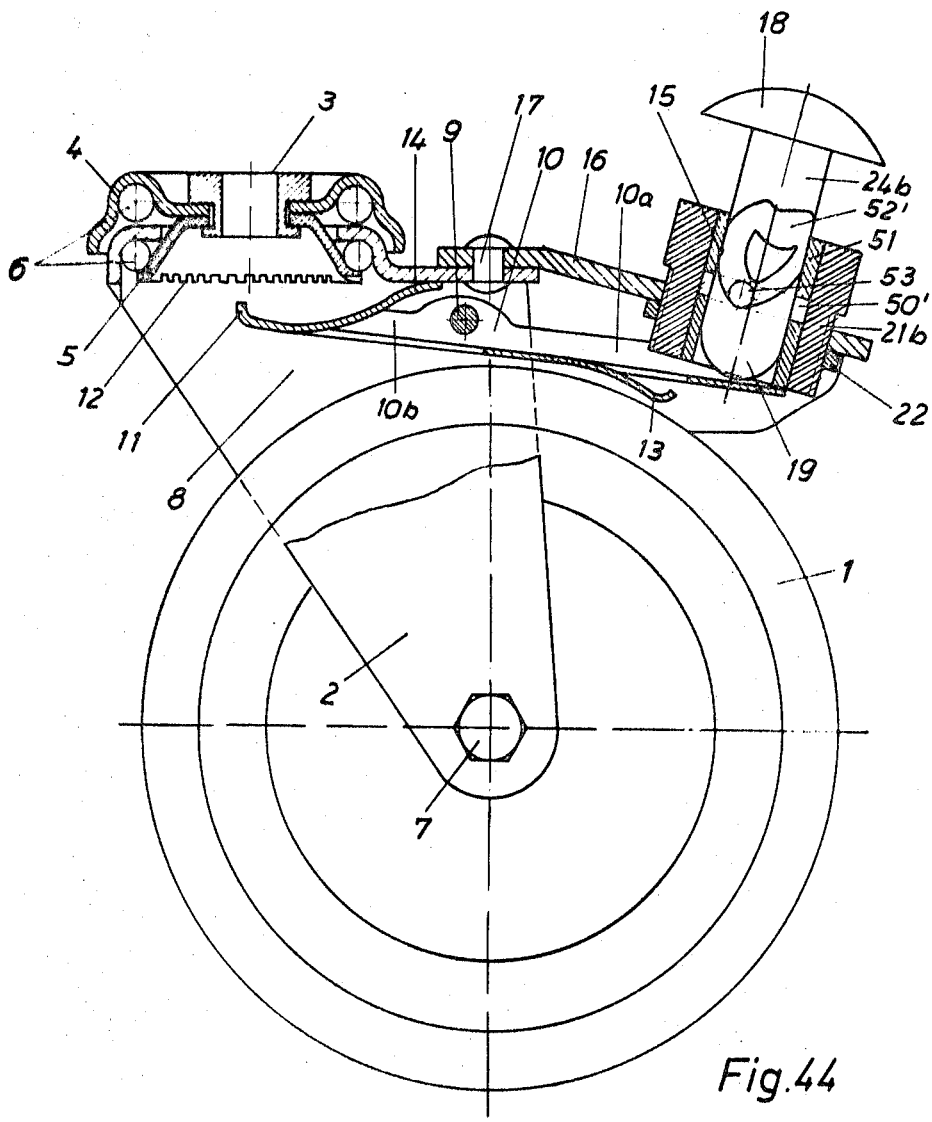
Figure 45:
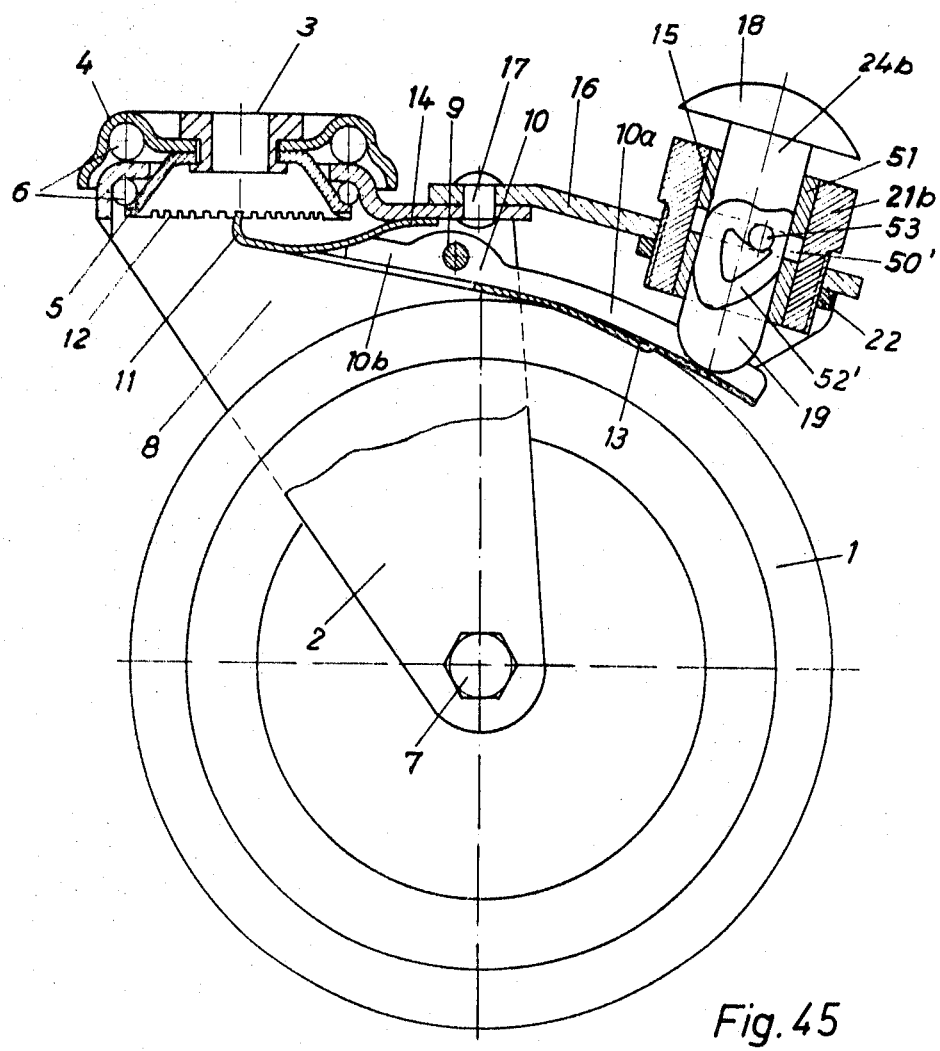
Figure 47:
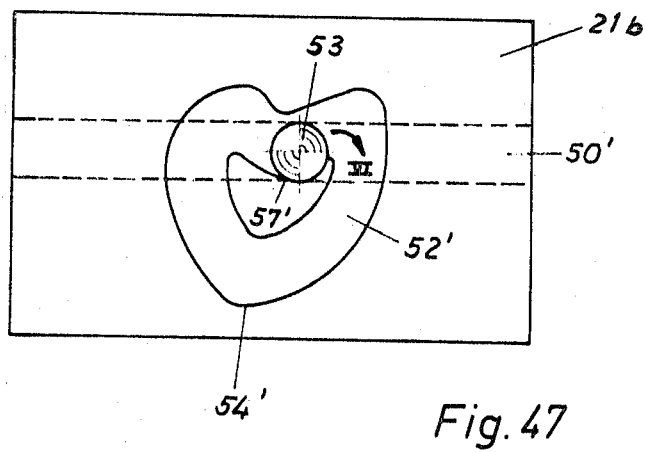
Figure 46:
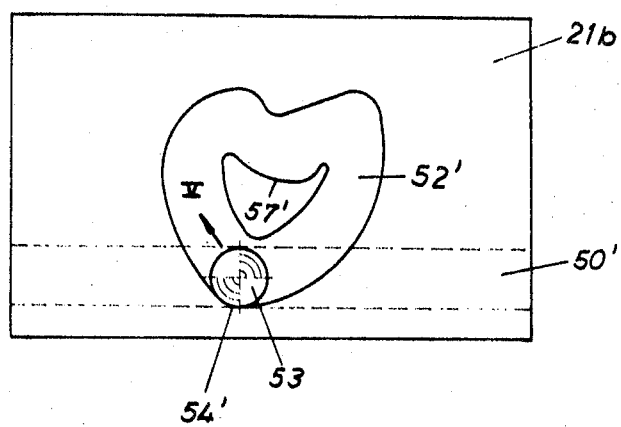

Specific embodiments of the invention, in its preferred application to casters, will now be described by way of example with reference to the accompanying diagrammatic drawings, in which:

FIG. 1 shows in vertical section a runner with a locking device having as a latching member a ballpoint pen press mechanism acting with a toothed shift sleeve, in the unlocked position, FIG. 2 shows a vertical section through the runner of FIG. 1 with the locking device in its locking position, FIGS. 3 and 4 show on a larger scale and in section the latching member only of FIGS. 1 and 2, consisting of a ballpoint pen press mechanism, in the unlocked position and the locking position, respectively, FIGS. 5 to 7 show, in a partly cutaway view, in plan and viewed from below, the toothed shift sleeve of the latching member shown in FIGS. 3 and 4, FIGS. 8 to 15 show the toothed shift sleeve of FIG. 5 in its separate operational stages in locking and later unlocking the runner, FIG. 16 shows in vertical section a runner with a locking device which has as a latching member a ballpoint pen press mechanism acting with a toothed rotary disc, in the unlocked position, FIG. 17 shows a vertical section through the runner of FIG. 16 with the locking device in its locking position, FIGS. 18 to 22 show on a larger scale and partly in section details of the latching member of FIGS. 16 and 17, consisting of a ballpoint pen press mechanism, FIG. 23 shows a view from below of FIG. 19, FIG. 24 shows a view from above of FIG. 20, FIG. 25 shows a view from above of FIG. 22, FIGS. 26 to 28 show on a larger scale a view partly cut away and partly in section, of the latching member of FIGS. 16 and 17, consisting of a ballpoint pen press mechanism, in its principal stages of operation, FIG. 29 is the associated view from below of the latching member of FIGS. 16 and 17, FIGS. 30 to 39 represent diagrammatically on a still larger scale, in a view and section in each case, the mode of operation of the ballpoint pen press mechanism for the latching member of FIGS. 26 to 28, during the locking and subsequent unlocking of the runner, FIG. 40 shows in vertical section a runner with a locking device having as latching member a ballpoint pen press mechanism acting with a ball guide arrangement (or pin guide arrangement instead), in the unlocked position, FIG. 41 shows a vertical section through the runner of FIG. 40 with the locking device in its locking position, FIGS. 42 and 43 show on a larger scale and developed diagrammatically the mode of operation of the ballpoint press mechanism working with a ball guide (or pin guide instead) arrangement, of the latching member of FIGS. 40 and 41, FIG. 44 shows as a modification of FIG. 40, in vertical section, a runner with a locking device which has as a latching member a ballpoint pen press mechanism with a different kind of ball guide arrangement, in the unlocked position, FIG. 45 shows a vertical section through the runner of FIG. 44 with the locking device in its locking positions, FIGS. 46 and 47 show on a larger scale and developed diagrammatically the mode of operation of the ballpoint pen press mechanism of the latching member of FIGS. 44 and 45 acting with a different kind of ball guide arrangement.

In the embodiments illustrated in FIGS. 1 and 2, FIGS. 16 and 17, FIGS. 40 and 41 and FIGS. 44 and 45, the runner takes the form of a completely lockable caster. The caster housing consists of a runner fork 2 holding a running wheel 1 and a caster back bearing 3, consisting of an outer ball cup 4 and an inner ball cup 5, together with balls 6. The running wheel 1 is supported in the runner fork 2 by means of a spindle 7.

The caster has a locking device for locking the running wheel 1 both in respect of running and also of swiveling. In the embodiments represented the locking device has a locking member 10, taking the form of a rocker 10a and 10b, articulately supported in the fork hollow 8 by means of a transverse spindle 9. The locking member 10, or rocker arms 10a and 10b, consists of a powerful laminated spring, which in the completely lockable caster represented, is pivotally supported as a two-armed bilateral lever in the fork hollow 8 by means of a transverse spindle 9. The locking members 10 has at one end 10b a catch edge 11, by which the member 10 can catch, for locking the running wheel 1 against swiveling, in ratched teeth 12 of the inner ball cup 5. At the other lever arm 10a the locking rocker 10, made of spring steel, has a bent over sprung tongue 13, by which the locking rocket 10, for locking the running wheel 1 against running movement, can press on its wheel periphery. A sprung tongue 14 bent up out of the locking member 10 is supported against the runner housing and tends to bias the locking member 10 continuously into its unlocked position.

The locking device has a latching member a ballpoint pen press mechanism 15, which in the embodiments represented is screwed into an extension arm 16 which is fixed to the runner housing by means of a rivet 17. In the embodiments represented, the latching member simultaneously acts as an actuating member, for which purpose the ballpoint pen press mechanism 15 has a pushbutton 18, which can be actuated by the point of the foot, in order to lock the runner and subsequently unlock it again. The latching component of the ballpoint pen press mechanism 15 has in the embodiments represented a clamping bolt 19, which in these embodiments can act directly on one laminated spring arm 10a of the locking member 10. The locking member 10 is continuously resiliently biassed by the bent-up tongue-shaped spring 14 against the clamping pin 19 of the ballpoint press mechanism 15 and thus held in contact, by which the actuating knob or button 18 is continuously pressed upwards. In the case of a caster or block runner which can only be locked against running, the locking member may consist simply of a unilaterally supported laminated spring 10a which is fixed to the runner housing, say by means of the rivet 17, in such a way that it acts resiliently and continuously by its free end on the clamping bolt 19 of the ballpoint pen press mechanism 15 and thus presses the actuating knob or button 18 continuously upwards.

In the embodiment represented in FIGS. 1 to 15 the locking device of the runner has as a latching member a ballpoint pen press mechanism 15, working with a toothed shift sleeve 20. The ballpoint pen press mechanism 15 is accommodated in a housing 21, which screws into a tapped bore of the extension arm 16 and is secured therein by means of a checknut 22 and closed by a hollow screwed plug 23. By screwing the housing 21 more or less deeply into the extension arm 16 the locking pressure of the locking device can be varied.

In the housing 21 there is supported a press pin 24, on which projections 25 and 26 are provided at different heights, and which are formed by pins inserted transversely through the press pin 24. The upper projection 25 engages in two grooves 27 of the screwed plug 23, by which the press pin 24 is held nonrotatably in the housing 21. The said press pin 24 is however axially movable in the housing 21 against the spring pressure which the return spring 14 exerts by means of the actuating arm 10a of the locking member 10 on the press end 19 of the press pin 24, when the press knob or button 18 provided at the top on the press pin 24 is actuated by the point of the foot. There is arranged coaxially round the press pin 24 the toothed shift sleeve 20, which is supported in the housing 21 so as to be axially immovable, but free to move in rotation.

The shift sleeve 20 has inner splines 28, of which in this embodiment there are four. At the two end faces 29a and 29b the shift sleeve 20 has in each case twice as many axially directed ratchet teeth 30 and 31, of which here in each case eight are provided. The projections 25 and 26, provided at different heights on the press pin 24, can cooperate with the inner splines 28 and the ratchet teeth 30 and 31 during the upward and downward movement of the press pin 24, by engagement in such a manner that with repeated actuation and release of the pushbutton 18 the end face toothed shift sleeve 20 is rotated in each case by one ratchet tooth 30 and thereby the upward movement of the press pin 24 is alternately locked or released.

Figure 8:
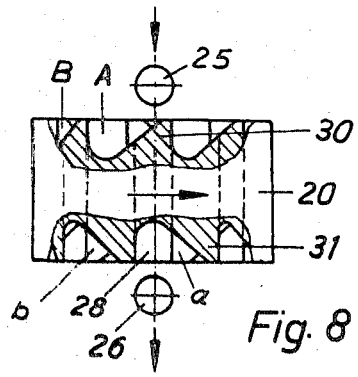
Figure 9:
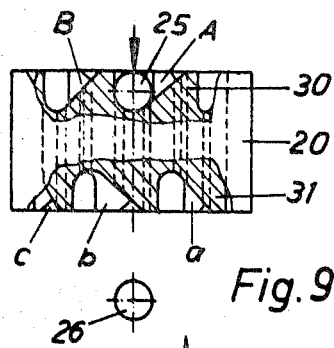
Figure 10:
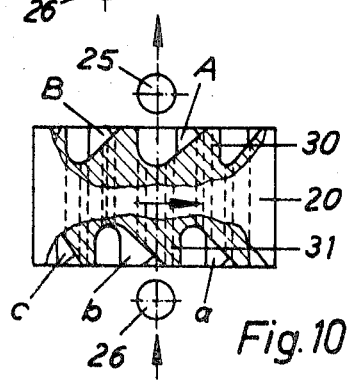
Figure 11:
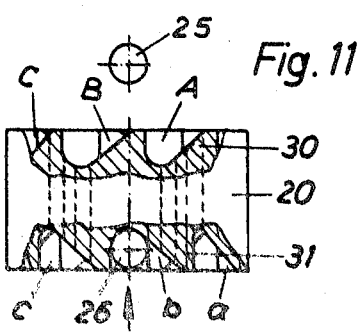
Figure 12:
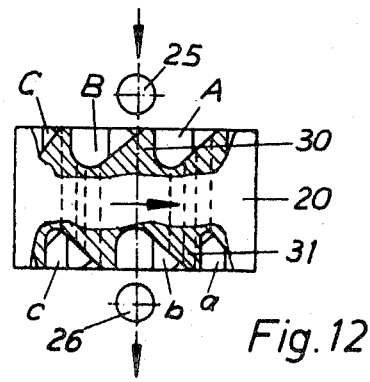
Figure 13:
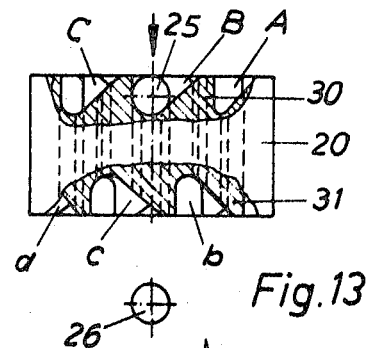

The mode of operation of the locking device acting with the toothed shift sleeve 20 is, according to FIGS. 8 to 15, as follows: When the locking device and its ballpoint pen press mechanism 15 acting as actuating and latching member, is in its unlocked position (FIG. 1 and FIG. 3) and the pushbutton 18 is then actuated with the point of the foot, the press pin 24 is pressed down against the resilient pressure of the locking rocker 10, and the lower transverse pin 26 leaves the inner spline 28 of the toothed shift sleeve 20 (FIG. 8). Meanwhile the upper transverse pin 25 acts on the tooth flank of the upper ratchet tooth 30 lying below and rotates the shift sleeve 20 until the transverse pin 25 penetrates the first tooth gap A of the upper teeth 30 (FIG. 9). When the pushbutton 18 is again released, the resilient locking member 10 again presses the press pin 24 upwards, causing the upper transverse pin 25 to emerge again from the upper teeth 30 (FIG. 10). Meanwhile the lower transverse pin 26 acts on the tooth flanks of the lower shift tooth 31 lying below and rotates the shift sleeve 20 in the direction of the arrow again, until the transverse pin 26 penetrates the tooth gap b of the lower teeth 31 (FIG. 11). This locks the return movement of the press pin 24, so that the locking pressure exerted by means of the pushbutton 18 and the press pin 24 on the locking rocker 10 is maintained, and the caster remains locked against both swiveling and running (FIG. 2 and FIG. 4). If the pushbutton 18 is now again actuated by the point of the foot and thereby the press pin 24 again pressed downwards against the resilient pressure of the locking member 10, then the lower transverse pin 26 leaves the tooth gap b of the lower a ratchet teeth 31 (FIG. 12). Meanwhile the upper transverse pin 25 acts on the tooth flank of the following upper ratchet tooth 30 lying below and again rotates the shift sleeve 20 in the direction of the arrow, until the transverse pin 25 penetrates the next tooth gap B of the upper ratchet teeth 30 (FIG. 13). When the pushbutton 18 is released again, the resilient locking members 10 presses the press pin up again, causing the upper transverse pin 25 to leave the tooth gap B of the upper ratchet teeth 30 (FIG. 14). Meanwhile the lower transverse pin 26 acts on the tooth flank of the lower ratchet tooth 31 lying above, and again rotates the shift sleeve 20 in the direction of the arrow until it can penetrate into the succeeding tooth gap c of the lower ratchet teeth 31 and hence also simultaneously into the corresponding succeeding inner spline 28' of the shift sleeve 20 (FIG. 15). By this the return movement of the press pin 24 is completely released, so that the locking device again travels back into its starting position and the caster is again released both as regards swiveling and also running (FIG. 1 and FIG. 3).

In the embodiment represented in FIGS. 16 to 39 the locking device of the runner has as a latching member a ballpoint pen press mechanism 15, working with a toothed rotary disc 35. The ballpoint pen press mechanism 15 is accommodated in a housing 21 which is screwed into a tapped bore of the extension arm 16 and secured therein by means of a checknut 22. By screwing the housing 21a to a greater or less depth into the extension arm 16 the locking pressure of the locking device can be varied.

The housing 21a simultaneously acts as a fixed sleeve, provided on the inside with deep splines 36 and having twice as many ratchet teeth 37, between which there are further located less deep splines 38 (FIG. 23). The ratchet teeth 37 extend axially and are directed towards the end face 39 of the fixed sleeve 21a (FIG. 19). In the embodiment represented the fixed sleeve 21a has 12 deep splines 36 and 24 ratchet teeth 37 and 12 shallower splines 38.

There is coaxially provided in the fixed sleeve 21 a hollow press pin 24a which is outwardly grooved at its end face 40 and is provided with likewise axially directed ratchet teeth 41, corresponding in number to the total number of splines 36 and 38 (FIG. 20 and FIG. 24). The ratchet teeth 41 of the press pin 24a engage in the shallower splines 38 of the fixed sleeve 21a to the whole depth and in the deeper splines 36 of the fixed sleeve 21a to about half the depth (FIG. 29). This makes the press pin 24a nonrotatable in the fixed sleeve 21a, but axially movable, under the guidance of the splines 36 and 38 of the fixed sleeve 21a. At the upper end, the hollow press pin 24a has an extension 42 to which a pushbutton 18 is riveted after the insertion of the press pin 24a in the sleeve 21a (FIG. 26).

There is likewise arranged coaxially with the fixed sleeve 21a and hence also with the hollow press pen 24a, a toothed rotary disc 35, which is deeply grooved at its periphery and is provided with radiation type or crown type teeth 43 (FIG. 22). The number of teeth 43 corresponds to the number of deep splines 36 of the fixed sleeve 21a. In the embodiment represented, the toothed rotary disc 35 has 12 teeth 43. The teeth 43 extend axially and are formed at the upwardly directed end face 44 of the rotary disc 35 as ratchet teeth, in order to be able to cooperate both with the ratchet teeth 41 to the hollow press pin 24a and also with the ratchet teeth 37 of the fixed sleeve 21a by engagement in such a way that with repeated actuation and release of the pushbutton 18 and hence of the press pin 24a the crown-toothed rotary disc on leaving the sleeve grooves 36 and on reentering the sleeve grooves 36 in each case is rotated by one ratchet tooth and with this successive rotary movement and its intermediate positions the reverse movement of the axially-movable rotary disc 35 is alternately locked or unlocked. The crown-toothed rotary disc 35 has a hollow upper lug 45 which can penetrate the recess 46 of the press pin 24a, the recess 47 provided in the lug 45 serving to accommodate a press spring 48 (FIG. 26). At the bottom, the toothed rotary disc 35 has a clamping bolt 19, by which the rotary disc 35 is pressed against the actuating arm 10a of the resilient locking member 10 and held in contact with this, while the press spring 48 on the other hand tends continuously to press upwards the hollow press pin 24a with its upper pushbutton 18 (FIG. 16). If the toothed rotary disc 35 assumes a position in which its teeth 43 correspond with the deep splines 36 of the fixed sleeve 21a, then the toothed rotary disc 35 can penetrate into the spline teeth of the fixed sleeve 21a and is thereby guided axially movable.

The mode of operation of the locking device acting with the toothed rotary disc 35 is, in accordance with FIGS. 30 to 39, as follows: If the locking device with its ballpoint pen press mechanism 15 acting as an actuating and latching member is in its unlocked position (FIG. 16 and FIG. 26), and if the pushbutton 18 is then actuated by the point of the foot, the hollow press pin 24a is depressed (FIG. 27) and the ratchet teeth 41 of the hollow press pin 24a accordingly push the ratchet teeth 43 of the rotary disc 35 downwards against the resilient pressure of the locking member 10 before them out of the deeper splines 36 of the fixed sleeve 21a (FIGS. 30 and 31). As soon as the ratchet teeth 43 of the rotary disc 35 have left the deeper splines 36 of the fixed sleeve 21a they slide as a result of the lateral component of force which the spring pressure of the locking member 10 produces in the ratchet teeth 43 of the rotary disc 35, along the end faces of the ratchet teeth 37, by which the toothed rotary disc 35 is rotated in the direction of the arrow (FIGS. 32 and 33). As the grooves 38 of the fixed sleeve 21a thereby reached are not as deep as the grooves 36 just left, the ratchet teeth 43 of the rotary disc 35 cannot penetrate into the grooves 38 (FIGS. 34 and 35). Accordingly the return movement of the axially-movable rotary disc 35 remains locked, while the press spring 48 only presses the hollow press pin 24a with its pushbutton 18 upwards back into its starting position (FIG. 28). Because of the locking of the return movement of the axially movable rotary disc 35, the locking pressure exerted by its clamping bolt 19 on the locking member 10 is maintained, which means that the runner remains locked both against swiveling and also against the running of its running wheel 1 (FIG. 17). If the pushbutton 18 is then again actuated, the hollow press pin 24a is thereby again depressed and the ratchet teeth 41 of the hollow press pin 24a at the end of their downward movement again encounter the ratchet teeth 43 of the locked rotary disc 35 and push this in front of them against the resilient counterpressure of the locking rocker 10 so far (FIG. 27) that they can slide on one another again because of the lateral force component with the resilient counterpressure of the locking members 10 produces, by which the toothed rotary disc 35 is further rotated in the direction of the arrow (FIGS. 36 and 37). Meanwhile the ratchet teeth 43 of the rotary disc 35 slide away over the succeeding ratchet teeth 37 of the fixed sleeve 21a and arrive at the succeeding deeper splines 36 of the fixed sleeve 21a, into which they can then penetrate during the return movement of the hollow press pin 24a and its ratchet teeth 41 (FIGS. 38 and 39). The return movement of the axially-movable rotary disc 35 is thereby again released, so that the unlocking spring 14 of the locking member 10 can guide the ballpoint pen press mechanism 15 back again into its starting position (FIG. 26) and the runner is again unlocked both as regards its capacity to swivel and as regards running of its running wheel 1 (FIG. 16).

In the embodiment represented in FIGS. 40 to 43 the locking device of the runner has as a latching member a ballpoint pen press mechanism 15 which works with a ball guide arrangement 50. The ballpoint pen press mechanism 15 is accommodated in a housing 21b, which is screwed into a tapped bore of the extension arm 16 and secured therein by means of a checknut 22. By screwing the housing 21b to a greater or less extent into the extension arm 16 the locking pressure of the locking device can be varied.

A sleeve 51 is fixed immovably in the housing 21b. There is coaxially supported in the fixed sleeve 51, axially movable, a press pin 24b, which has at the top a pushbutton 18 and can act by its lower end, formed as a clamping bolt 19, on the resilient locking member 10 of the locking device of the runner. The axially movable press pin 24b has an outer groove 52, which is a transverse groove. There is also provided in the fixed sleeve 51 an inner groove 50 which acts as an arcuate guide track for the guidance of one or more balls 53.

When an axial displacement of the press pin 24b takes place there is a change in the position at which the transverse groove 52 of the press pin 24 intersects the arcuate guide track 50 of the fixed sleeve 51. A ball 53 is provided as a locking body, freely movable in the point of intersection of the two grooves 50 and 52. The two grooves 50 and 52 are only deep enough for the ball 53 to engage to half its depth in the arcuate guide groove 50 of the fixed sleeve 51 and the other half in the transverse groove 52 of the axially movable press pin 24b. The point of intersection of the two grooves 50 and 52 thus forms a bearing cage surround the ball 53 on all sides so that the said ball 53, freely movable per se, cannot escape. The said ball 53 is therefore compelled, when an axial displacement of the press pin 24b occurs, to rolling conjointly with the point of intersection of the grooves 50 and 52, so that the ball 53, with repeated actuation and release of the press pin 24b, can be guided by the transverse groove 52 into one or more locking and unlocking positions of the guide track 50 in such a way that the return movement of the press pin b is thereby alternately locked or released.

Instead of the transverse groove 52, the axially movable press pin 24b may also be provided with a transverse pin, whose projecting ends take over the duty of the balls 53, so that only a slight rotary mobility of the press pin 24b has to be taken into consideration. It is then a question of a ballpoint pen press mechanism acting with a pin guide arrangement 50 as latching member of the locking device, inasmuch as the projecting pin heads 53, upon repeated actuation and release of the axially movable press pin 24b are guided into one or more locking positions and unlocking positions of the arcuate guide track 50 in such a way that the return movement of the press pin 24b is thereby alternately locked or unlocked.

The mode of operation of the locking device working with the ball guide arrangement 50, in FIGS. 42 and 43, is as follows: If the locking device with its ballpoint pen press mechanism 15 acting as an actuating and latching member is in its unlocked position (FIG. 40), then the ball 53 acting as a locking body is also in the highest release position 54 of the arcuate guide track 50 (FIG. 42). If the pushbutton 18 is now actuated by the point of the foot, the axially movable press pin 24b is depressed against the resilient counterpressure of the locking member 10 and then the ball 53 is conjointly moved downwards through the transverse groove 52 of the press pin 24b in the direction of the arrow and thereby encounters the downwardly inclined wall p0int 55 of the guide groove 50 located thereunder. With the further downward movement of the transverse groove 52 the oblique wall 55 pushes the ball 53 parallel to the transverse groove 52 in the direction of the arrow II along the arcuate guide track 50. When the pushbutton 18 is released again the resilient locking member 10 presses the axially movable press pin 24b back in the upward direction, whereby the ball 53 now moved upward with the transverse groove 52 abuts against the oblique wall point 56 of the guide groove 50 located above it and is guided by this into the locking position 57 of the guide track 50 (FIG. 43). In this locking position 57 the ball 53 locks the return movement of the press pin 24b, by which the locking force exerted by the press pin 24b on the actuating arms 10a of the locking rocker 10, is maintained and the caster is locked both against swiveling and also against the running of its running wheel 1 (FIG. 41). If the pushbutton 18 is then again actuated by the point of the foot, the press pin 24b is thereby again depressed against the counterpressure of the locking rocker 10 and the transverse groove 52 of the press pin 24b guides the ball 53 conjointly downwards again. The said ball 53 thereby encounters in the direction of arrow III the oblique wall point 58 of the guide track 50 lying below it, and is pushed further by this parallel to the transverse groove 52 along the guide groove 50 in the direction of the arrow IV. When the pushbutton 18 is again released the resilient locking rocker 10 presses the axially movable pin 24b upwards again, whereby the transverse groove 52 of the press pin 24b moves the ball 53 up again. The said ball 53 thereby encounters the oblique wall point 59 of the guide curve 50 lying above, and is guided by this into the succeeding uppermost unlocking position 54 (FIG. 42). This ends the locking pressure exerted on the locking rocker 10, so that the unlocking spring 14 can move back the locking device into its starting position and the runner is unlocked again both as regards swiveling and running of its running wheel 1 (FIG. 40).

In the modifications represented in FIGS. 44 to 47 the locking device of the runner has a latching member a ballpoint pen press mechanism 15, again acting with a ball guide arrangement 52'. This ballpoint pen press mechanism 15 differs from the ballpoint pen press mechanism of FIGS. 40 to 43 essentially in an interchange of the arrangement of the transverse groove and the guide track. In these modified embodiments the fixed sleeve 51 has the transverse groove 50', while the arcuate guide track 52' is provided exteriorly on the axially-movable press pin 24b. The guide curve or cam 52' in these modifications is made heart-shaped and intersects the transverse groove 50' of the fixed sleeve 51, in which connection in the point of intersection of the two grooves 50' and 52' a ball 53 is again supported freely movable, the said ball travelling conjointly (rolling) with the varying point of intersection of the grooves 50' and 52'.

The control curve 52' has a lowermost unlocking position 54', in which is located the ball 53 (FIG. 46), when the runner is unlocked both as regards its capacity to swivel and also the capacity to run off its running wheel 1 (FIG. 44). If the pushbutton 18 is actuated with the point of the foot, the press pin 24b is thereby depressed against the counterpressure of the resilient locking member 10 and the guide track 52' is also thereby moved downwards and the ball 53 is moved on through the transverse groove 50' of the fixed sleeve 51 in the direction of the arrow V, until the said ball 53 arrives, upon further release of the pushbutton 18, in the upper locking position 57' (FIG. 47). There the ball 53 locks the return movement of the press pin 14b, whereby the locking pressure exerted by the press pin 24b on the locking member 10 is maintained and the runner is locked both as regards its capacity to swivel and the capacity to run off its running wheel 1 (FIG. 45). With renewed actuation of the pushbutton 18 the transverse groove 50' of the fixed sleeve 51 again raises the ball 53 out of its trough type locking position 59' in the direction of the arrow VIY. By this the return movement of the press pin 24b is again released, so that the unlocking spring 14 of the locking rocker 10 can lift the press pin 24b back into its staring position, and the runner is unlocked again both as regards its capacity to swivel and also the capacity to run off its running wheel 1 (FIG. 44).

Instead of the embodiments represented, the ballpoint pen press mechanism 15 acting as a latching member of the locking device can also be arranged at some other point of the runner, for instance, hidden in the recess 8 of the runner fork 2, in which connection there are then provided for the locking of the swiveling and/or running movements of the running wheel a correspondingly adapted locking member and a suitable actuating member for the action on the ballpoint pen press mechanism, which may be of known type.

I claim:

1. A caster including a housing assembly and a wheel horizontally and vertically pivotally connnected thereto in combination with means for locking said wheel against turning or swiveling and with actuating and deactuating means to engage and disengage, respectively, said locking means; wherein said actuating and deactuating means is a ballpoint pen double press, latch-release mechanism comprising an actuator housing, a spring biased member in said actuator housing, a displaceable press means on said housing engaged to said spring biased member, contact means between said spring biased member and said spring biased lever means, and lock means within said actuator housing operative with respect to said actuating housing and said spring biased member, to lock said spring biased member in one of two alternately disposed positions responsive to pressing said press means; wherein said locking means comprises engagement means on said housing, spring biased lever means engageable with said engagement means to prevent swiveling of said wheel and arm means attached to said lever means engageable with said wheel to prevent turning of said wheel; and wherein said lever means, and thereby said arm means and said engagement means, are actuated to an engaging position by depressing said ballpoint pen mechanism and are deactuated to a disengaging position by again depressing said ballpoint pen mechanism.

2. Runner with a locking device for locking the running wheel against running and/or swiveling as claimed in claim 1, which can be brought into its locking position by means of a pedal actuating member against spring pressure and latched and then unlocked again, said ballpoint pen press mechanism acting with a toothed rotary disc as a latching member.

3. Runner with a locking device for locking the running wheel against running and/or swiveling as claimed in claim 1 which can be brought into its locking position by means of a pedal actuating member against spring pressure and latched and then unlocked again, wherein said ballpoint pen press mechanism is actuatable through a pushbutton by the point of the foot.

4. Runner as claimed in claim 3, characterized in that the latching component of the ballpoint pen press mechanism has a clamping bolt which acts directly on a locking member provided in the hollow of the runner fork which is resiliently applied against the clamping bolt.

5. Runner as claimed in claim 4, characterized in that the locking member is a laminated spring which presses continuously against the clamping ballpoint pen press mechanism.

6. Runner as claimed in claim 4, characterized in that the locking member is a rocker supported in the hollow of the runner fork and which is pressed by one of its lever arms continuously against the clamping bolt of the ballpoint pen press mechanism.

7. A caster as claimed in claim 1, wherein said actuator housing comprises a toothed shift sleeve.

8. A caster as claimed in claim 7, wherein said press means is a foot actuated, spring biased pedal means.

9. A caster as claimed in claim 7, wherein said press pin is axially movable against spring pressure and nonrotatable, and wherein said shift sleeve is rotatable and axially immovable with inner splines and with twice as many axially directed ratchet teeth at each end face thereof cooperating with projections arranged at different heights on said press pin whereby each actuation and release of said press pin rotates said toothed shift sleeve end face by one ratchet tooth pitch and thereby alternately locking and releasing the return movement of said press pin.

10. A caster as claimed in claim 9, wherein said press means is a foot actuated, spring biased pedal means.

11. A caster as claimed in claim 1, wherein said ballpoint pen actuator engagement means is a ball guide assembly.

12. A caster as claimed in claim 11, wherein said press means is a foot actuated, spring biased pedal means.

13. A caster as claimed in claim 11, wherein said ball guide assembly comprises a fixed sleeve with an inner and an outer groove and said press pin being axially movable within said sleeve, wherein one of said grooves is a guide track for a ball lock of said ball guide assembly and the other of said grooves the first of said grooves, whereby actuation and release of said press pin guides said ball into a locking or unlocking position along said guide track.

14. A caster as claimed in claim 13, wherein said press means is a foot actuated, spring biased pedal means.

15. A caster as claimed in claim 1 wherein said ballpoint pen actuator engagement means is a pin guide assembly.

16. A caster as claimed in claim 15, wherein said press means is a foot actuated, spring biased pedal means.

17. A caster as claimed in claim 1, wherein said ballpoint pen actuator engagement means is a swiveling coupling pin assembly.

18. A caster as claimed in claim 17, wherein said press means is a foot actuated, spring biased pedal means.

19. Runner with a locking device for locking the running wheel against running and/or swiveling, which can be brought into its locking position by means of a pedal actuating member against spring pressure and latched and then unlocked again, characterized in that its locking device has a ballpoint pen press mechanism acting with a rotatable toothed disc as a latching member, which has a fixed sleeve with inner splines and with, to the end face twice as many axially directed ratchet teeth and also, guided longitudinally movably coaxially in the sleeve and in the grooves both an outwardly grooved axially-movable nonrotatable press pin with the same number of axially directed ratchet teeth at the end face and also an axially-movable rotatable disc grooved at the periphery and having crown type teeth which can cooperate with the end face ratched teeth of the sleeve and the press pin by engagement in such a way that upon repeated actuation and release of the press pin the crown type toothed rotatable disc on leaving the sleeve grooves and then on reentering into the sleeve grooves is rotated in each case by one ratchet tooth pitch and thereby the return movement of the axially movable rotatable disc is alternately locked or released.

20. Runner with a locking device for locking the running wheel against running and/or swiveling, which can be brought into its locking position by means of a pedal actuating member against spring pressure and latched and then unlocked again, characterized in that its locking device has a ballpoint pen press mechanism with a pushbuttton which can be actuated by the point of the foot, the said mechanism acting with a rotatable toothed disc, as an actuating and latching member, the said latching member having a fixed sleeve with inner splines and with, to the end face twice as many axially directed ratchet teeth and also coaxially longitudinally movably guided in the sleeve and in the grooves both an outwardly grooved axially movable nonrotatable press pin with at the end face the same number of axially directed ratchet teeth and also an axially-movable rotatable disc grooved at the periphery and having crown type teeth which can cooperate with the end face ratchet teeth of the sleeve and of the press pin by engagement in such a way that upon repeated actuation and release of the press pin the crown type toothed rotatable disc on leaving the sleeve grooves and then on reentering into the sleeve grooves is rotated in each case by one ratchet tooth pitch and thereby the return movement of the axially-movable rotary disc is alternately locked or released.

UNITED STATES PATENT OFFICE
CERTIFICATE OF CORRECTION

Patent No. 3,571,842        Dated March 23, 1971

Inventor(s)  Dietrich Fricke

It is certified that error appears in the above-identified patent and that said Letters Patent are hereby corrected as shown below:

Column 1, line 22, cancel "brought", second occurrence; line 75, should read -- of a shift sleeve rotatable with respect to the pushbutton and --. - Column 2, line 75, should read -- 1,090,547 and 1,187,520. --. Column 3, line 30, Colu line 5, and Column 12, line 10, "ratched", each occurrence, should read -- ratchet --. Column 3, line 31, "groove" shoul read -- grooves --. Column 9, line 43, after "has" insert ---. Column 11, line 21, after "grooves" insert -- intersects Signed and sealed this 17th day of August 1971.

(SEAL)
Attest:

EDWARD M. FLETCHER, JR.
Attesting Officer

WILLIAM E. SCHUYLER
Commissioner of Pate